United States Patent
Chamberlin et al.

(10) Patent No.: US 8,095,925 B2
(45) Date of Patent: Jan. 10, 2012

(54) SEAMLESS NETWORK INSTALLATION OF DEVICE DRIVERS

(75) Inventors: David Chamberlin, Oakland, CA (US); Sang Yoon Lee, Walnut Creek, CA (US); Zhencai Wang, Concord, CA (US)

(73) Assignees: Kyocera Mita Corporation, Chuo-ku, Osaka-shi, Osaka (JP); Kyocera Technology Development, Inc., Concord, CA (US)

(*) Notice: Subject to any disclaimer, the term of this patent is extended or adjusted under 35 U.S.C. 154(b) by 1254 days.

(21) Appl. No.: 10/942,445

(22) Filed: Sep. 15, 2004

(65) Prior Publication Data

US 2006/0059482 A1    Mar. 16, 2006

(51) Int. Cl.
*G06F 9/44* (2006.01)
*G06F 9/445* (2006.01)

(52) U.S. Cl. ........ 717/174; 717/168; 717/171; 717/172; 717/176; 717/177

(58) Field of Classification Search .................. None
See application file for complete search history.

(56) References Cited

U.S. PATENT DOCUMENTS

| | | | |
|---|---|---|---|
| 5,684,957 A | 11/1997 | Kondo | |
| 5,742,829 A * | 4/1998 | Davis et al. | 717/178 |
| 5,745,884 A | 4/1998 | Carnegie | |
| 5,826,085 A | 10/1998 | Bennett | |
| 5,960,167 A | 9/1999 | Roberts | |
| 6,094,531 A | 7/2000 | Allison | |
| 6,119,160 A | 9/2000 | Zhang | |
| 6,219,054 B1 | 4/2001 | Komoda | |
| 6,269,481 B1 * | 7/2001 | Perlman et al. | 717/178 |
| 6,271,752 B1 | 8/2001 | Vaios | |
| 6,301,012 B1 * | 10/2001 | White et al. | 358/1.15 |
| 6,356,965 B1 | 3/2002 | Broyles | |
| 6,493,719 B1 | 12/2002 | Booth | |
| 6,505,245 B1 | 1/2003 | North | |
| 6,530,018 B2 | 3/2003 | Fleming | |
| 6,553,336 B1 | 4/2003 | Johnson | |
| 6,567,860 B1 | 5/2003 | Maxwell | |
| 6,601,101 B1 | 7/2003 | Lee | |
| 6,607,314 B1 | 8/2003 | McCannon | |
| 6,693,722 B1 | 2/2004 | Mixer | |
| 6,714,992 B1 | 3/2004 | Kanojia | |
| 6,728,787 B1 | 4/2004 | Leigh | |
| 6,789,111 B1 * | 9/2004 | Brockway et al. | 709/222 |
| 6,996,815 B2 * | 2/2006 | Bourke-Dunphy et al. | 717/168 |
| 7,213,060 B2 * | 5/2007 | Kemp et al. | 709/222 |
| 7,334,227 B2 * | 2/2008 | Kim et al. | 717/178 |
| 7,363,623 B2 * | 4/2008 | Kishida | 717/174 |
| 7,383,554 B2 * | 6/2008 | Ozaki et al. | 719/327 |
| 7,418,701 B2 * | 8/2008 | Yoda et al. | 717/176 |

(Continued)

*Primary Examiner* — Insun Kang (57) ABSTRACT

A method seamlessly installs, upgrades, and deletes printer and other device drivers over a network. Instead of a computer periodically searching or scanning the network, searching occurs when a user logs into a computer. If a new device is found, driver installation is carried out using seamless pop-up GUI integrated into the OS, rather than by a wizard. The method includes providing a domain controller and a user computer connected to the network; searching the network for newly added devices when detecting a user login; and installing device drivers for the found newly added devices. The method also includes optionally-silent and seamless pop-up GUI; use of scripts and WSH (Windows Scripting Host); deletion grace periods; TCP/IP and/or SNMP; automatically upgrading existing drivers if necessary; maintaining tables of currently installed, to-be-installed, and to-be-deleted devices; applying pre-defined device settings; and obtaining information of a device and applying the information to the driver.

20 Claims, 7 Drawing Sheets

U.S. PATENT DOCUMENTS

| | | |
|---|---|---|
| 7,461,375 B2 * 12/2008 | Kazumi et al. | 717/176 |
| 7,478,383 B2 * 1/2009 | Shahindoust et al. | 717/172 |
| 7,552,432 B2 * 6/2009 | Aiba | 717/177 |
| 7,743,374 B2 * 6/2010 | Machida | 717/176 |
| 7,853,946 B2 * 12/2010 | Minagawa | 717/178 |
| 2001/0054102 A1 12/2001 | Kacines | |
| 2002/0067504 A1 * 6/2002 | Salgado et al. | 358/1.15 |
| 2002/0069213 A1 * 6/2002 | Moslander et al. | 707/203 |
| 2002/0073303 A1 6/2002 | French | |
| 2002/0147973 A1 * 10/2002 | Fordemwalt et al. | 717/174 |
| 2002/0161939 A1 * 10/2002 | Kim et al. | 710/8 |
| 2003/0088651 A1 * 5/2003 | Wilson, Jr. | 709/221 |
| 2003/0217192 A1 * 11/2003 | White et al. | 709/321 |
| 2003/0225933 A1 * 12/2003 | Suzuki | 709/321 |
| 2003/0233428 A1 12/2003 | Spitzer | |
| 2004/0010795 A1 * 1/2004 | Sasaki et al. | 719/321 |
| 2004/0057072 A1 * 3/2004 | Borchers et al. | 358/1.15 |
| 2004/0205743 A1 * 10/2004 | Sugahara | 717/168 |
| 2005/0068558 A1 * 3/2005 | Wang et al. | 358/1.13 |
| 2005/0086332 A1 * 4/2005 | Nakazawa | 709/223 |
| 2005/0114474 A1 * 5/2005 | Anderson et al. | 709/220 |
| 2005/0125529 A1 * 6/2005 | Brockway et al. | 709/224 |
| 2005/0138157 A1 * 6/2005 | Jung et al. | 709/223 |
| 2005/0155079 A1 * 7/2005 | Chen et al. | 725/115 |
| 2005/0204355 A1 * 9/2005 | Yoda et al. | 717/176 |
| 2005/0210464 A1 * 9/2005 | Machida | 717/174 |
| 2007/0245333 A1 * 10/2007 | Ferlitsch | 717/168 |

* cited by examiner

| 410 | Start installing a device |
|---|---|

| 420 | If a confirmation is to be displayed, display a seamless pop-up dialog box to confirm installation (The pop-up dialog contains the checkbox, "Do not show this message again") |
|---|---|

| 430 | If installation is not specified, then END |
|---|---|

| 440 | Query for Config (device settings) information |
|---|---|

| 450 | Build profile (data structure) |
|---|---|

| 460 | Install and/or upgrade driver from INF location |
|---|---|

| 470 | Add device entry |
|---|---|

| 480 | Apply profile (default, predefined printer preferences) Apply profile (device settings obtained from device) |
|---|---|

| 490 | Publish to active directory queue |
|---|---|

SEAMLESS NETWORK INSTALLATION OF DEVICE DRIVERS

CROSS-REFERENCES TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to the field of computer peripheral device drivers, and more particularly to installing and upgrading device drivers over a network.

BACKGROUND OF THE INVENTION

Device drivers are generally known, including a printer driver. Typically, printing from a computer occurs through the use of a printer driver. Upon either an application launch or during a print command load time, the application will call an instance of the printer driver and provide the user with an interface to set the desired printer driver settings. Printer driver settings may also be called printer options, print settings, driver options, printer parameters, print selections, etc. The printer driver settings specify preferences on features of the printer.

There has been a great increase in the types and varieties of peripheral devices available and connected by network to a computer. These devices include printers, scanners, keyboards, disk drives, video cameras, etc. When a new device is added, a corresponding device driver ("driver") must exist in the computer's memory. If a device driver does not exist in the computer's memory, a new driver must be installed. Installing a new driver often involves forcing the user to make cumbersome choices using a installation Wizard GUI. One method for detecting newly added device to a network is polling, in which a periodic scanning/searching of the network for a newly added device by a computer is performed. However, the problem with the polling method is that this causes network traffic and processor workload.

The present invention arose out of the above concerns associated with providing methods for seamlessly installing and upgrading device drivers over a network.

SUMMARY OF THE INVENTION

Methods, computer program products, computing and printing systems for seamlessly installing and upgrading device drivers over a network are described. Instead of a computer periodically searching or scanning the network, searching occurs when a user logs into a computer. Moreover, if a new device is found, driver installation is carried out in a seamless pop-up GUI which is integrated as a part of the OS, rather than by a Wizard-like GUI. Methods include providing at least one Domain Controller connected to the network; providing at least one User Computer connected to the network; searching the network for newly added devices when detecting a user login; and installing device drivers for the found newly added devices. Methods also include optionally-silent, seamless, pop-up GUI; use of scripts and WSH (Windows® Scripting Host), searching for unavailable devices and deleting drivers for them; use of deletion grace periods; use of TCP/IP and/or SNMP; automatically upgrading existing drivers if necessary; maintaining tables of currently installed, to-be-installed, and to-be-deleted devices; applying pre-defined device settings; getting information of a device and applying the information to the driver; and use on printer drivers.

The invention will be more fully understood upon consideration of the detailed description below, taken together with the accompanying drawings.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
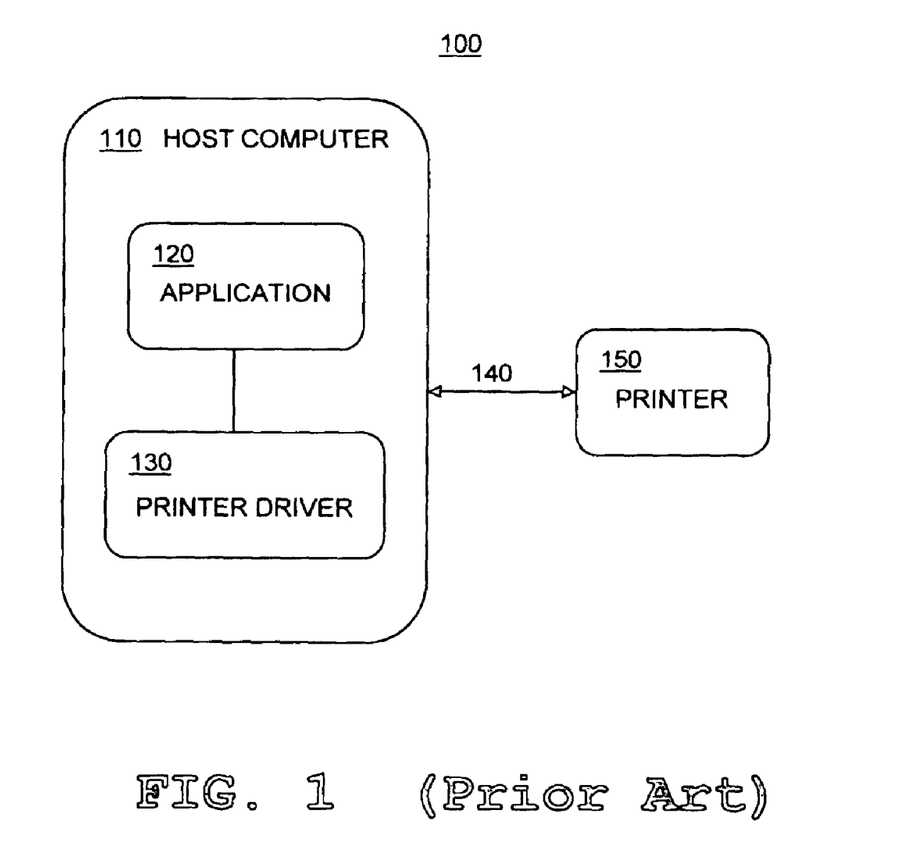
FIG. 1 is a simplified block diagram showing connection of a computing system to a printer.

FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS® (Disk Operating System) Windows®, Unix®, Linux®, Palm® OS, or Apple® OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments may use examples pertaining to printer drivers, but they are to be understood as similarly applicable to other kinds of device drivers.

Figure 2:
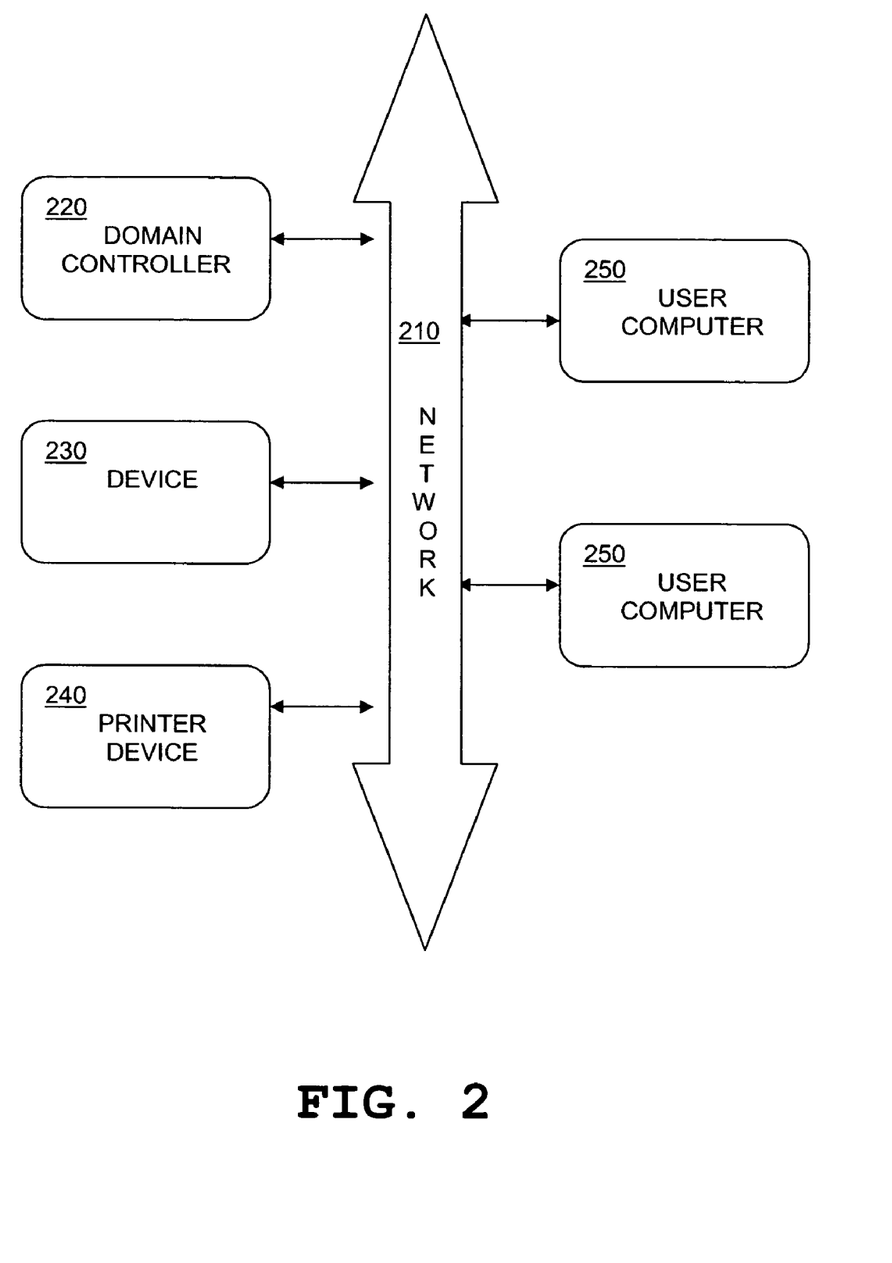
FIG. 2 is a simplified block diagram showing Domain Controllers, Devices, and User Computers connected to a network, in accordance with a preferred embodiment of the present invention.

FIG. 2 is a simplified block diagram showing Domain Controllers, Devices, and User Computers connected to a network, in accordance with a preferred embodiment of the present invention. Connected by the network 210 are Domain Controllers 220, devices 230, printer devices 240, and User Computers 250. The network connection 210 may be a traditional printer cable through a parallel interface connection or any other method of connecting a computer to a printer used in the art, e.g., a serial interface connection, a remote network connection, a wireless connection, or an infrared connection.

Figure 3:
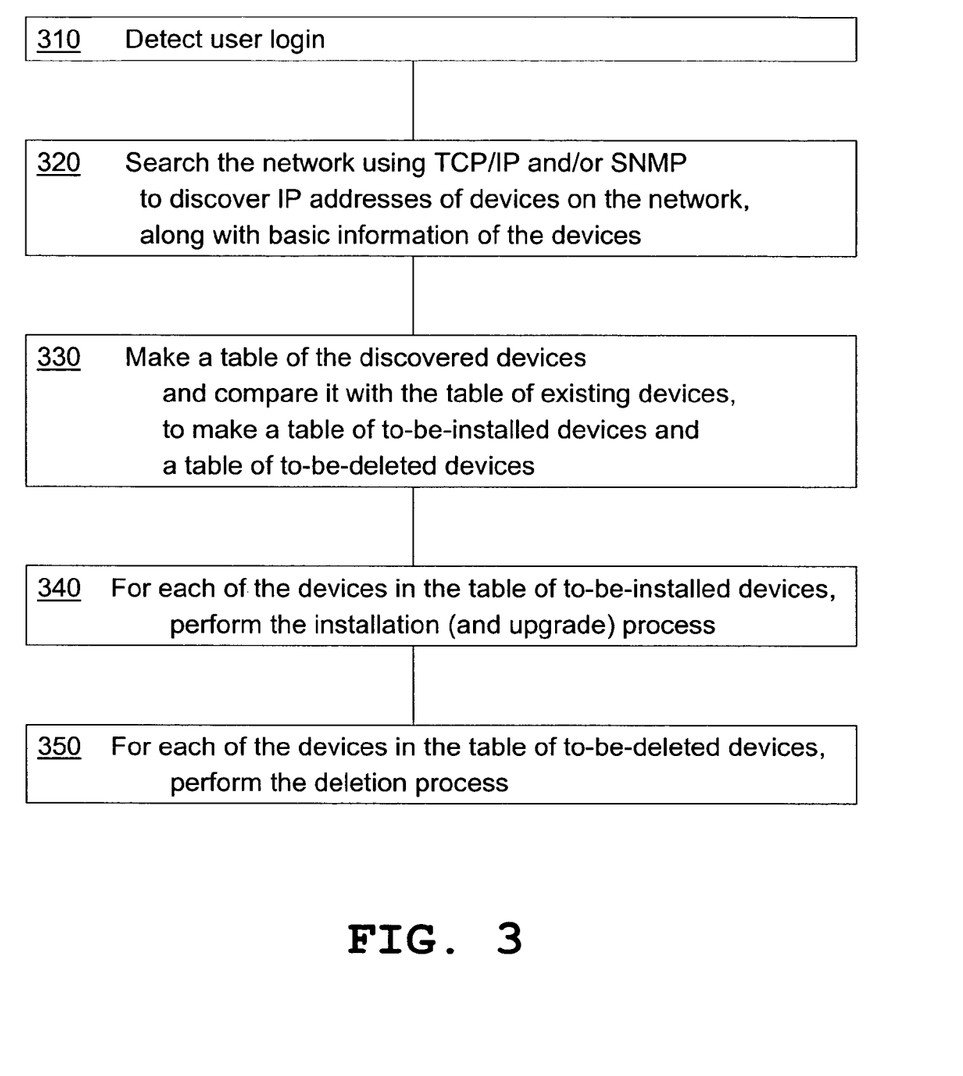
FIG. 3 is a flowchart showing an overview of the overall process of device driver installation, upgrading, and deletion, in accordance with a preferred embodiment of the present invention.

FIG. 3 is a flowchart showing an overview of the overall process of device driver installation, upgrading, and deletion, in accordance with a preferred embodiment of the present invention. In step 310, a user login to a User Computer is detected. The methods for this and the other steps are described in more detail in conjunction with later figures.

In step 320 a search of the network using TCP/IP and/or SNMP to discover IP addresses of all devices on the network, along with basic information of the devices. SNMP (Simple Network Management Protocol) is a standard Internet protocol for managing software and devices on the network. The basic information of a discovered device is used to distinguish between two different devices that may be connected at the same IP address.

In step 330, a table of discovered devices is made, and it is compared with the table of existing devices. As a result of this comparison, tables of to-be-installed devices and to-be-deleted devices are made. The table of to-be-installed devices contain to-be-installed devices and to-be-updated devices.

In step 340, for each of the devices in the table of to-be-installed devices, installation (and updating) is performed. In the following descriptions, whenever installation is mentioned, it is to be understood that upgrading may be performed when the device driver needs to be upgraded. Thus, installation usually means installation (and upgrading) unless specifically noted otherwise. In step 350, for each of the devices in the table of to-be-deleted devices, deletion is performed.

Figure 4:
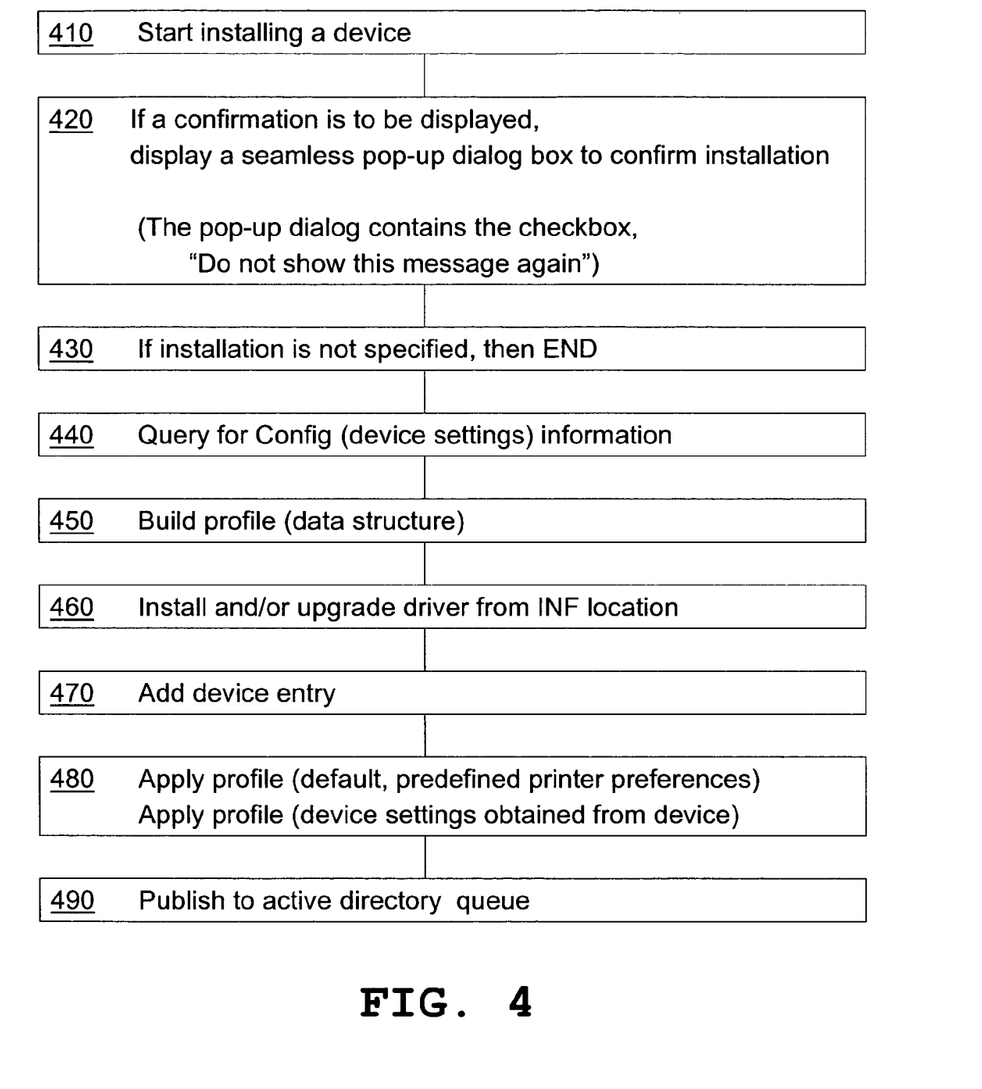
FIG. 4 is a flowchart showing installation of a device, in accordance with a preferred embodiment of the present invention.

FIG. 4 is a flowchart showing installation of a device, in accordance with a preferred embodiment of the present invention. In step 410, the installation (and upgrading) process of a device is started. In step 420, if a confirmation is to be displayed, a seamless, popup dialog is displayed to confirm installation. This is a seamless dialog rather than a wizard. A wizard is made of various dialogs, each dialog displayed after another. A wizard is usually used to guide through a process of performing some action such as an installation. Each dialog in a wizard typically contains buttons such as Back, Next, Cancel and Finish. The seamless dialog is integrated into the operating system and appears as a part of the operating system. This popup dialog contains a checkbox, labeled "Do not show this message again". If this checkbox is checked, the popup dialog will not be displayed next time, even if it would be displayed otherwise. In step 430, if installation is not specified in the last step, then the installation process ends and goes no further. In step 440, query is made for configuration (device settings) information, to obtain hardware setting information through SNMP. During installation, the installer obtains the hardware (device) setting through network SNMP and sets the hardware setting to the newly installed printer entry. In step 450, profile (data structure) is made. Profile (data structure) comprises two parts, printer preferences and hardware (device) setting. In step 460, installation and/or upgrade of the driver is performed from the INF location. In step 470, a device entry is added. In step 480, printing preferences and device settings are applied. Profile (defaults) is the default, predefined printer preferences, and the device setting is the hardware setting information obtained from a device. In step 490, it is published to active directory queue.

Figure 5:
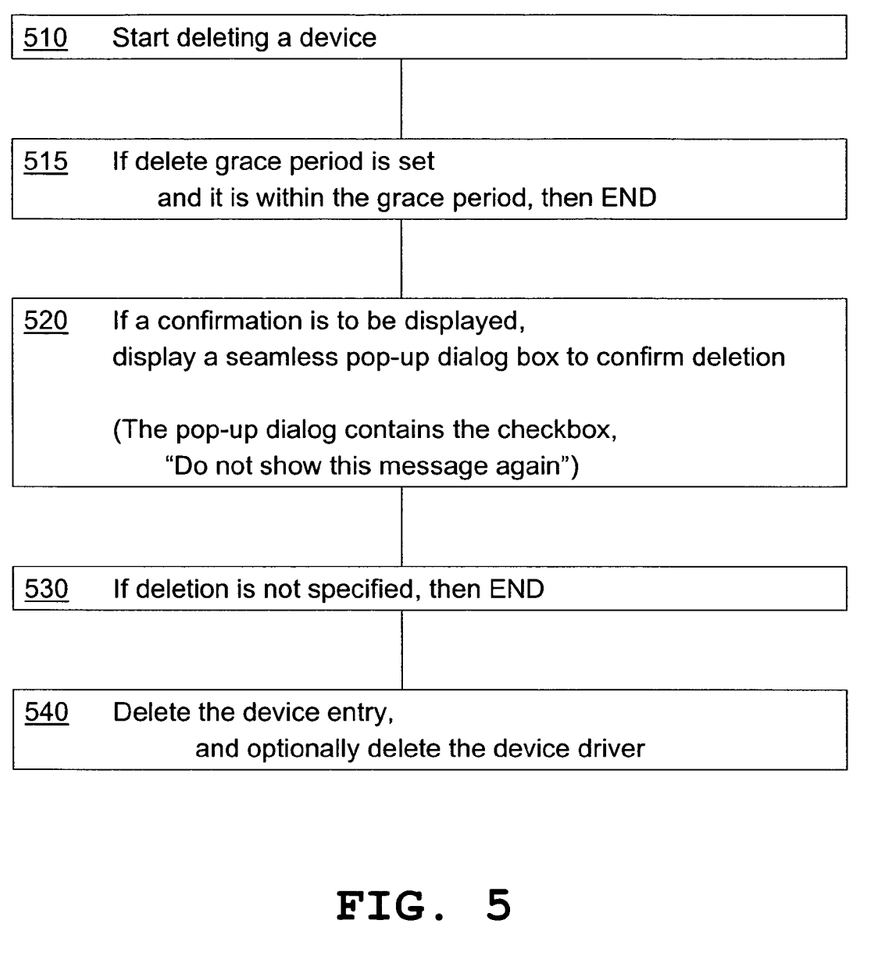
FIG. 5 is a flowchart showing deletion of a device, in accordance with a preferred embodiment of the present invention.

FIG. 5 is a flowchart showing deletion of a device, in accordance with a preferred embodiment of the present invention. In step 510, the deletion process of a device is started. In step 515, if a delete grace period is set, and it is within the grace period, then the process ends and goes no further. A delete grace period is set by the user to specify that deletion should only occur if the device has been missing, unavailable, or undetected for some period of time. For example, if the delete grace period is set to three days and a device has been unavailable or undetected for two days, then the deletion of the device would not occur. It is also possible to specify the grace period using or combining the aspect of how many logins there have been while the device has been unavailable or undetected. In step 520, if a confirmation is to be displayed, a seamless, popup dialog is displayed to confirm installation. This is a seamless dialog rather than a wizard. A wizard is made of various dialogs, each dialog displayed after another. A wizard is usually used to guide through a process of performing some action such as an installation. Each dialog in a wizard typically contains buttons such as Back, Next, Cancel and Finish. The seamless dialog is integrated into the operating system and appears as a part of the operating system. This popup dialog contains a checkbox, labeled "Do not show this message again". If this checkbox is checked, the popup dialog will not be displayed next time, even if it would be displayed otherwise. In step 530, if deletion is not specified in the last step, then the installation process ends and goes no further. Otherwise, if deletion is specified, the device entry is deleted. If this is the only device entry, then the device driver may also be deleted.

Figure 6:
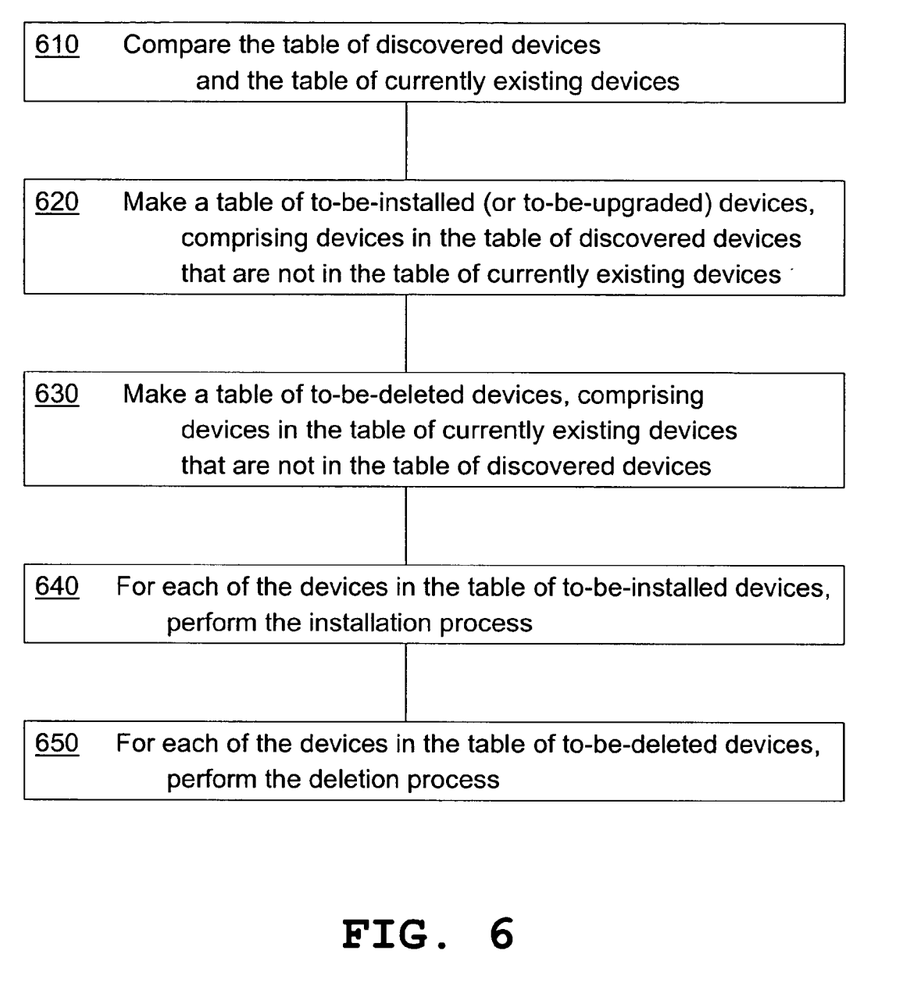
FIG. 6 is a flowchart showing comparing discovered devices and existing devices to make tables of to-be-installed and to-be-deleted devices, in accordance with a preferred embodiment of the present invention.

FIG. 6 is a flowchart showing comparing discovered devices and existing devices to make tables of to-be-installed and to-be-deleted devices, in accordance with a preferred embodiment of the present invention. In step 610, comparison of discovered and currently existing devices is made. In step 620, a table of to-be-installed (or to-be-upgraded) devices is made. This table comprises devices in the table of discovered devices that are not in the table of currently existing devices. In step 630, a table of to-be-deleted devices is made. This table comprises devices in the table of currently existing devices that are not in the table of discovered devices. A device that is in the table of currently existing devices but not in the table of discovered devices may be removed or unavailable for some reason such as due to malfunction. In step 640, for each of the devices in the table of to-be-installed devices, the installation process is performed. This is the process described in FIG. 4. In step 650, for each of the devices in the table of to-be-deleted devices, the deletion process is performed. This is the process described in FIG. 5.

Figure 7:
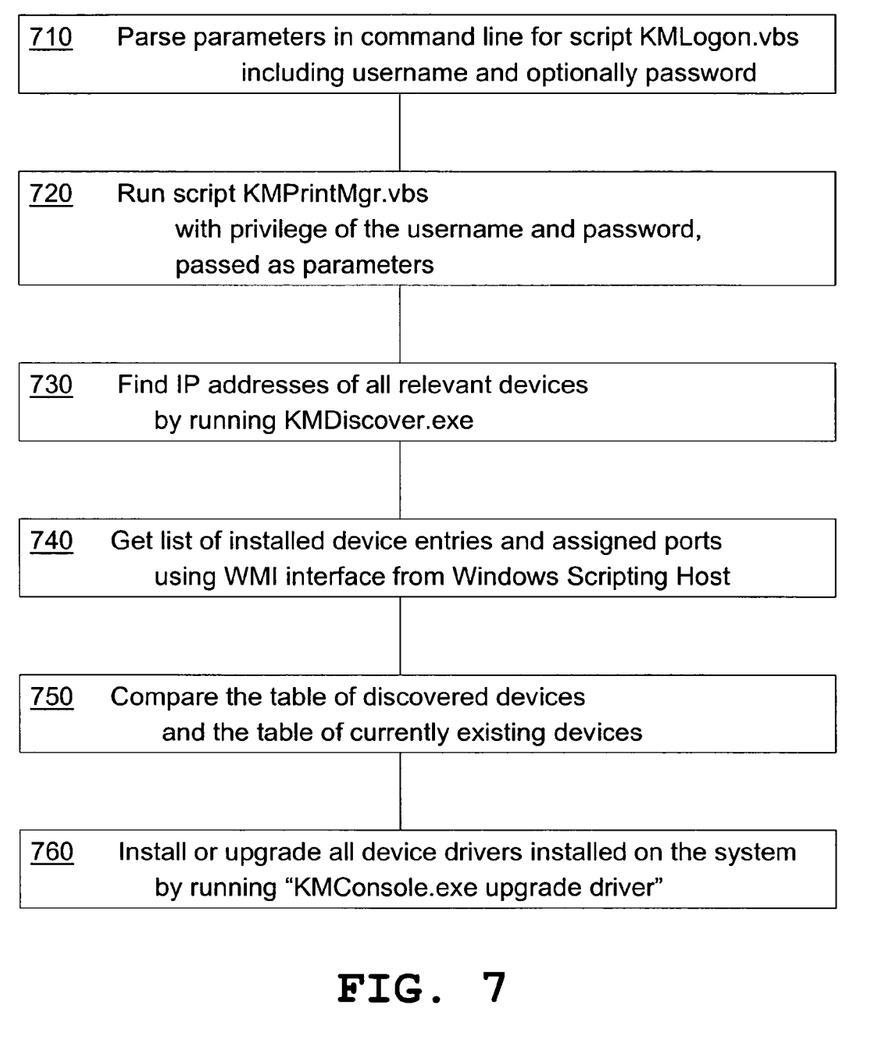
FIG. 7 is a flowchart showing use of scripts, in accordance with a preferred embodiment of the present invention.

FIG. 7 is a flowchart showing use of scripts, in accordance with a preferred embodiment of the present invention. In step 710, parsing of the parameters in command line for script KMLogon.vbs is performed, including username and optionally password. In step 720, the script KMPrintMgr.vbs is run with privilege of the username and password, passed as parameters. This privilege must be sufficient to install device drivers. In step 730, IP addresses of all relevant devices are discovered by running KMDiscover.exe program, by searching the specified local network or IP address range. In step 740, a list of installed device entries and assigned ports are obtained using WMI interface from Windows® Scripting Host. In step 750, a comparison is made between the table of discovered devices and the table of currently existing devices. This is described in FIG. 5. In step 760, installation (or upgrade) is performed on all device drivers installed on the system by running "KMConsole.exe upgrade driver" program.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows® terminology, one skilled in this art could see how the disclosed methods can be used with other operating systems, such as DOS®, Unix®, Linux®, Palm® OS, or Apple® OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for installing and using a device driver across a network, comprising computer executed method steps of:
   providing a network device that can be connected to anywhere in the network;
   providing at least one domain controller and at least one user computer connected to the network;
   upon detecting a user login to the at least one user computer, searching the network for at least one newly added network device that is added to any point in the network;
   creating a table of discovered devices comprising discovered devices from searching the network for the at least one newly added network device;
   comparing the table of discovered devices with a table of currently existing devices to produce a table of to-be-installed devices, wherein the table of to-be-installed devices optionally comprises to-be-updated devices;
   installing device drivers for the at least one newly added network device onto only the at least one user computer;
   enabling use of the at least one newly added network device from the at least one user computer so that access from the at least one user computer goes directly to the at least one newly added network device;
   comparing the table of discovered devices with the table of currently existing devices to produce a table of to-be-deleted devices comprising devices in the table of currently existing devices that are not in the table of discovered devices; and
   for each device in the table of to-be-deleted devices, deleting the device if a delete grace period is set by a user and the delete grace period is exceeded or if the delete grace period and login attempts are exceeded while the device has been unavailable or undetected, optionally displaying and prompting a seamless popup dialog integrated into an operating system of the at least one user computer, the dialog being optionally invisible to the user, and optionally deleting the corresponding device driver of the device if the device corresponds to an only device entry.

2. The method of claim 1, wherein the installing of the device drivers comprises providing optionally-silent and seamless pop-up GUI.

3. The method of claim 1, wherein the detecting of the user login or the installing of the device drivers comprises running of script files, comprising computer executed method steps of:
   parsing parameters in a command line including a username and optionally a password;
   running a check with the username and password as parameters to determine privilege sufficiency to install a required device driver, wherein confirmation is made to determine that privilege of the username and password, passed as the parameters is sufficient to install the required device driver;
   discovering all relevant devices in the network and IP address range;
   obtaining a list of installed device entries and assigned ports using WMI interface from Windows scripting host;
   comparing using the script files and the at least one user computer the table of discovered devices and the table of currently existing devices; and
   running the script files to install and upgrade all the discovered devices and to delete each device in the table of to-be-deleted devices, with optionally confirming for the delete grace period, in the seamless popup dialog which is invisible to the user.

4. The method of claim 1, further comprising: searching the network for unavailable devices when detecting the user login; and deleting device drivers for the searched unavailable devices.

5. The method of claim 1, wherein the searching of the at least one newly added network device comprises using TCP/IP or SNMP.

6. The method of claim 1, further comprising automatically upgrading the device drivers for the at least one newly added network device if necessary.

7. The method of claim 1, further comprising maintaining the tables of currently existing devices, to-be-installed devices, and to-be-deleted devices.

8. The method of claim 1, further comprising applying pre-defined device settings.

9. The method of claim 1, further comprising obtaining information of the at least one newly added network device and applying the information to the device drivers for the at least one newly added network device.

10. The method of claim 1, wherein the device drivers are printer drivers.

11. A computer program product stored on a computer relating to an operation of the image forming and printing apparatus for installing and using a device driver across a network, comprising machine-readable code for causing a machine to perform the computer executed method steps of:
providing a network device that can be connected to anywhere in the network;
providing at least one domain controller and at least one user computer connected to the network;
upon detecting a user login to the at least one user computer, searching the network for at least one newly added network device that is added to any point in the network;
creating a table of discovered devices comprising discovered devices from searching the network for the at least one newly added network device;
comparing the table of discovered devices with a table of currently existing devices to produce a table of to-be-installed devices, wherein the table of to-be-installed devices optionally comprises to-be-updated devices;
installing device drivers for the at least one newly added network device onto only the at least one user computer;
enabling use of the at least one newly added network device from the at least one user computer so that access from the at least one user computer goes directly to the at least one newly added network device;
comparing the table of discovered devices with the table of currently existing devices to produce a table of to-be-deleted devices comprising devices in the table of currently existing devices that are not in the table of discovered devices; and
for each device in the table of to-be-deleted devices, deleting the device if a delete grace period is set by a user and the delete grace period is exceeded or if the delete grace period and login attempts are exceeded while the device has been unavailable or undetected, optionally displaying and prompting a seamless popup dialog integrated into an operating system of the at least one user computer, the dialog being optionally invisible to the user, and optionally deleting the corresponding device driver of the device if the device corresponds to an only device entry.

12. The computer program product of claim 11, wherein the installing of the device drivers comprises providing optionally-silent and seamless pop-up GUI, and wherein the detecting of the user login or the installing of the device drivers comprises running of script files, comprising computer executed method steps of:
parsing parameters in a command line including a username and optionally a password;
running a check with the username and password as parameters to determine privilege sufficiency to install a required device driver, wherein confirmation is made to determine that privilege of the username and password, passed as the parameters is sufficient to install the required device driver;
discovering all relevant devices in the network and IP address range;
obtaining a list of installed device entries and assigned ports using WMI interface from Windows scripting host;
comparing using the script files and the at least one user computer the table of discovered devices and the table of currently existing devices; and
running the script files to install and upgrade all the discovered devices and to delete each device in the table of to-be-deleted devices, with optionally confirming for the delete grace period, in the seamless popup dialog which is invisible to the user.

13. The computer program product of claim 11, further comprising machine-readable code for causing the machine to search the network for unavailable devices when detecting the user login; and deleting device drivers for the searched unavailable devices, wherein the deleting of the device drivers is performed only when a deletion grace period is exceeded.

14. The computer program product of claim 11, wherein the searching of the at least one newly added network device comprises using TCP/IP or SNMP, and further comprising machine-readable code for causing the machine to automatically upgrade the device drivers for the at least one newly added network device if necessary and to maintain the tables of currently existing devices, to-be-installed devices, and to-be-deleted devices.

15. The computer program product of claim 11, further comprising machine-readable code for causing the machine to apply pre-defined device settings and to obtain information of the at least one newly added network device and applying the information to the device drivers for the at least one newly added network device.

16. A computing system having a processor relating to an operation of the image forming and printing apparatus, comprising a program programmed for installing and using a device driver across a network, comprising computer executed method steps of:
providing a network device that can be connected to anywhere in the network;
providing at least one domain controller and at least one user computer connected to the network;
upon detecting a user login to the at least one user computer, searching the network for at least one newly added network device that is added to any point in the network;
creating a table of discovered devices comprising discovered devices from searching the network for the at least one newly added network device;
comparing the table of discovered devices with a table of currently existing devices to produce a table of to-be-installed devices, wherein the table of to-be-installed devices optionally comprises to-be-updated devices;
installing device drivers for the at least one newly added network device onto only the at least one user computer;
enabling use of the at least one newly added network device from the at least one user computer so that access from the at least one user computer goes directly to the at least one newly added network device;

comparing the table of discovered devices with the table of currently existing devices to produce a table of to-be-deleted devices comprising devices in the table of currently existing devices that are not in the table of discovered devices; and for each device in the table of to-be-deleted devices, deleting the device if a delete grace period is set by a user and the delete grace period is exceeded or if the delete grace period and login attempts are exceeded while the device has been unavailable or undetected, optionally displaying and prompting a seamless popup dialog integrated into an operating system of the at least one user computer, the dialog being optionally invisible to the user, and optionally deleting the corresponding device driver of the device if the device corresponds to an only device entry.

17. The computing system of claim 16, wherein the installing of the device drivers comprises providing optionally-silent and seamless pop-up GUI, and wherein the detecting of the user login or the installing of the device drivers comprises running of script files, comprising computer executed method steps of:

parsing parameters in a command line including a username and optionally a password;

running a check with the username and password as parameters to determine privilege sufficiency to install a required device driver, wherein confirmation is made to determine that privilege of the username and password, passed as the parameters is sufficient to install the required device driver;

discovering all relevant devices in the network and IP address range;

obtaining a list of installed device entries and assigned ports using WMI interface from Windows scripting host;

comparing using the script files and the at least one user computer the table of discovered devices and the table of currently existing devices; and running the script files to install and upgrade all the discovered devices and to delete each device in the table of to-be-deleted devices, with optionally confirming for the delete grace period, in the seamless popup dialog which is invisible to the user.

18. The computing system of claim 16, further comprising code for causing the machine to search the network for unavailable devices when detecting the user login; and deleting device drivers for the searched unavailable devices, wherein the deleting of the device drivers is performed only when a deletion grace period is exceeded.

19. The computing system of claim 16, wherein the searching of the at least one newly added network device comprises using TCP/IP or SNMP, and further comprising machine-readable code for causing the machine to automatically upgrade the device drivers for the at least one newly added network device if necessary and to maintain the tables of currently existing devices, to-be-installed devices, and to-be-deleted devices.

20. The computing system of claim 16, further comprising a print engine and code for applying pre-defined device settings and to obtain information of the at least one newly added network device and applying the information to the device drivers for the at least one newly added network device.

* * * * *